United States Patent
Andrews et al.

(10) Patent No.: US 9,516,106 B2
(45) Date of Patent: *Dec. 6, 2016

(54) SYSTEM AND METHOD FOR PEER-TO-PEER MANAGEMENT THROUGH POLICY AND CONTEXT REPLICATION

(71) Applicant: DELL PRODUCTS, LP, Round Rock, TX (US)

(72) Inventors: Carlton A. Andrews, Austin, TX (US); Douglas M. Anson, Dripping Springs, TX (US); Sandeep V. Karandikar, Austin, TX (US); David Konetski, Austin, TX (US); Frank H. Molsberry, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,224

(22) Filed: Feb. 9, 2016

(65) Prior Publication Data

US 2016/0156706 A1   Jun. 2, 2016

(51) Int. Cl.
*H04L 29/08* (2006.01)
*H04L 29/06* (2006.01)
*H04W 12/04* (2009.01)

(52) U.S. Cl.
CPC ............ *H04L 67/104* (2013.01); *H04L 67/34* (2013.01); *H04L 63/061* (2013.01); *H04W 12/04* (2013.01)

(58) Field of Classification Search
CPC ...... H04L 67/104; H04L 67/34; H04L 63/061; H04L 12/04; H04W 12/04
USPC .......................................................... 709/227
See application file for complete search history.

(56) References Cited

U.S. PATENT DOCUMENTS

| | | | |
|---|---|---|---|
| 6,064,973 A | 5/2000 | Smith et al. | |
| 7,664,885 B2* | 2/2010 | Carapelli | H01Q 1/00 709/220 |
| 2006/0080321 A1* | 4/2006 | Horn | G06F 17/30867 |
| 2007/0060103 A1 | 3/2007 | Patterson et al. | |
| 2007/0140696 A1* | 6/2007 | DeCusatis | H04J 14/08 398/98 |
| 2000/8028900 | 11/2008 | Brown et al. | |
| 2009/0235244 A1 | 9/2009 | Enomori et al. | |
| 2010/0242037 A1 | 9/2010 | Xie et al. | |
| 2011/0289202 A1 | 11/2011 | Riley | |
| 2012/0155646 A1 | 6/2012 | Seshadri et al. | |

* cited by examiner

*Primary Examiner* — Andrew Chriss
*Assistant Examiner* — Ellen Kirillova
(74) *Attorney, Agent, or Firm* — Larson Newman, LLP (57) ABSTRACT

A method of context replication including receiving a first context item at a first system in a network, determining that the first system is a context management master system, establishing a first peer-to-peer session with a second system in the network in response to determining that the first system is the context management master system, and providing, from the first system, the first context item to the second system.

14 Claims, 5 Drawing Sheets

SYSTEM AND METHOD FOR PEER-TO-PEER MANAGEMENT THROUGH POLICY AND CONTEXT REPLICATION

CROSS REFERENCE TO RELATED APPLICATIONS

This application is a continuation of U.S. patent application Ser. No. 13/680,179, entitled "System and Method for Peer-to-Peer Management Through Policy and Context Replication," filed on Nov. 19, 2012, the disclosure of which is hereby expressly incorporated by reference in its entirety.

FIELD OF THE DISCLOSURE

This disclosure relates generally to information handling systems, and relates more particularly to peer-to-peer management through policy and context replication.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
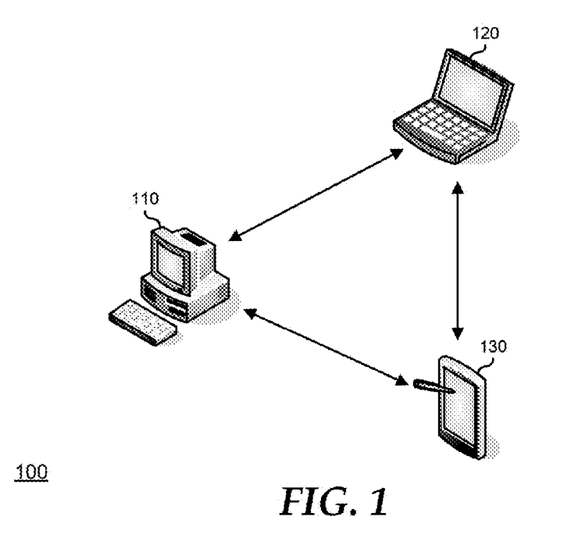
FIGS. 1-4 are block diagrams of a network according to an embodiment of the present disclosure.

FIG. 1 illustrates a network 100 for one or more information handling systems. For purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Network 100 includes systems 110, 120, and 130 that are connected together via one or more communication interfaces. Network 100 represents a home network or small business network. For example, where network 100 represents a home network, system 110 can represent one or more desktop computers, system 120 can represent one or more laptop computers, and system 130 can represent one or more mobile devices such as smart phones, tablet devices, or other mobile computing devices. In another example, where network 100 represents a small business network, system 110 can represent one or more workstation or desktop computers, system 120 can represent one or more laptop computers, and system 130 can represent one or more mobile devices such as smart phones, tablet devices, or other mobile computing devices. In a particular embodiment, network 100 includes other systems or devices, such as a game console, a television, a set-top box, another media device, a memory storage array, a network switch, a router, a firewall, or other network device. Systems 110, 120, and 130 are connected together via one or more local area network (LAN) or wireless network (WiFi) interfaces, such as an Ethernet interface, a universal serial bus (USB) interface, or another LAN interface, an IEEE 802.11a/b/g/n interfaces, a Bluetooth interface, or another WiFi interface, or a combination thereof, as needed or desired. In a particular embodiment, network 100 is also connected to a wide area network (WAN) such as a digital subscriber line (DSL) network, an Internet service provider (ISP) network, or another WAN, as needed or desired.

Network 100 is characterized in that systems 110, 120, and 130 are not maintained and managed by a centralized system. Thus, systems 110, 120, and 130 can be provided with policies, software, drivers, security keys, and the like, by a user of network 100. In a particular embodiment, each of systems 110, 120, and 130 are maintained and managed separately. As such, a user of network 100 can determine a network access policy to be implemented in the network, and can separately set up each of systems 110, 120, and 130 with the network access policy. For example, each of systems 110, 120, and 130 can be separately set up to enforce a parental control policy, a power management policy, or the like. The user can likewise determine that each of systems 110, 120, and 130 are to be provided with common software or device drivers, and can separately install the software or device drivers on each system. Further, the user can separately provide each of systems 110, 120, and 130 with a common security key, such as a WiFi access credential for network 100, a network password, or the like.

In another embodiment, maintenance or management of one of systems 110, 120, or 130 is propagated through network 100, such that the other systems are similarly maintained and managed. As such, the user of network 100 can determine a network access policy to be implemented in the network, and can set up one of systems 110, 120, or 130 with the network access policy, and can direct that system to propagate the access policy to the other systems. For example, system 110 can be set up to enforce a parental control policy, a power management policy, or the like, and system 110 can propagate the policy to systems 120 and 130. The user can likewise determine that each of systems 110, 120, and 130 are to be provided with common software or device drivers. The user can install the software or device drivers on one of systems 110, 120, or 130, and the installation can be propagated to the other systems. Further, the user can provide one of systems 110, 120, or 130 with a security key, such as a WiFi access credential for network 100, a network password, or the like, and the security key can be propagated to the other systems.

Figure 2:
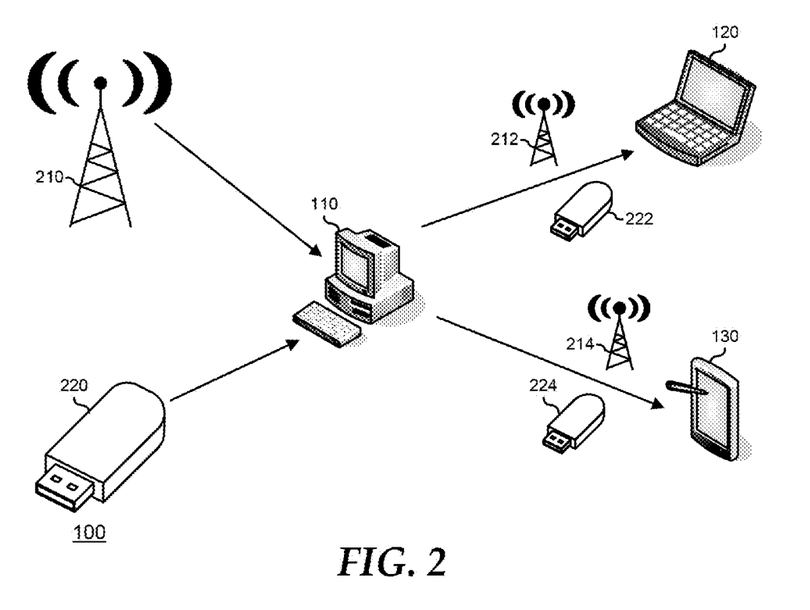

FIG. 2 illustrates an embodiment of network 100 where a system 110 receives a network access policy 210 and a hardware access policy 220. For example, network access policy 210 can include a WiFi access credential, a parental control policy, or another policy that governs the access to a network resource. Hardware access policy 220 can include a USB access policy that governs the ability of system 110 to transfer files to, or read files from a USB storage device, or that permits only registered USB storage devices to be used on the system. Network access policy 210 and hardware access policy 220 can be implemented on system 110 by a user of network 100, or can be received from another system, such as a policy management system (not illustrated).

In this embodiment, system 110 operates as a master system for policy management to distribute network access policy 210 and hardware access policy 220 to systems 120 and 130. Here, when system 110 receives network access policy 210, a first copy 212 of the network access policy is provided to system 120, and a second copy 214 is provided to system 130. Similarly, when system 110 receives hardware access policy 220, a first copy 222 of the hardware access policy is provided to system 120, and a second copy 224 is provided to system 130. In a particular embodiment, system 110 is designated as the policy management master system based upon a configuration of network 100 where the designation is static and is limited to the system. In another embodiment, system 110 is designated as the policy management master system based upon the fact that network access policy 210 and hardware access policy 220 are first provided to the system. Here, for example, if network access policy 210 had been received by system 120, then system 120 would operate as the policy management master system to provide copies of the network access policy to systems 110 and 130. In yet another embodiment, system 110 is designated as the policy management master system based upon the fact that the system is logged as the policy management master system for network 100. Here, any one of systems 110, 120, and 130 can be logged as the policy management master system for network 100, for example by a user who has a password authentication to make policy changes to the network.

Figure 3:
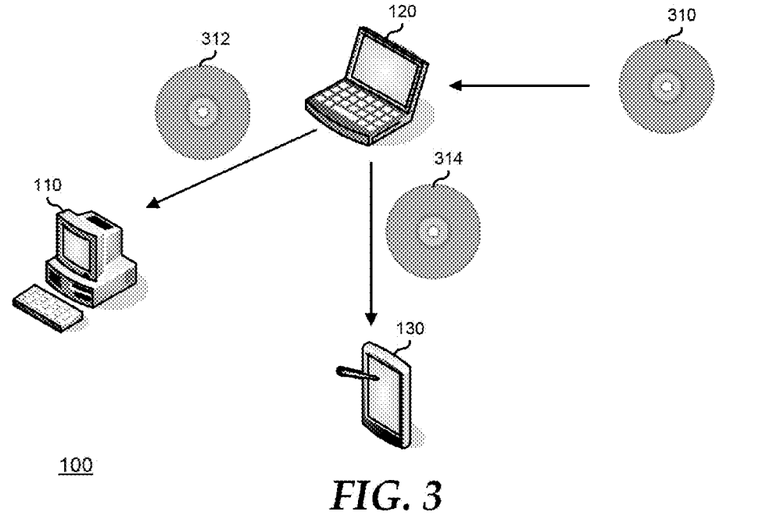

FIG. 3 illustrates an embodiment of network 100 where system 120 receives software 310. For example, software 310 can include a new software program, an update to an existing software program, a device driver, or the like. Software 310 can be provided to system 120 by a user of network 100, or can be received from another system, such as a software or driver update system (not illustrated). In this embodiment, system 120 operates as a master system for software management to distribute software 310 to systems 110 and 130. Here, when system 120 receives software 310, a first copy 312 of the software is provided to system 110, and a second copy 314 is provided to system 130. System 120 is designated as the software management master by one or more of the methods described above.

Figure 4:
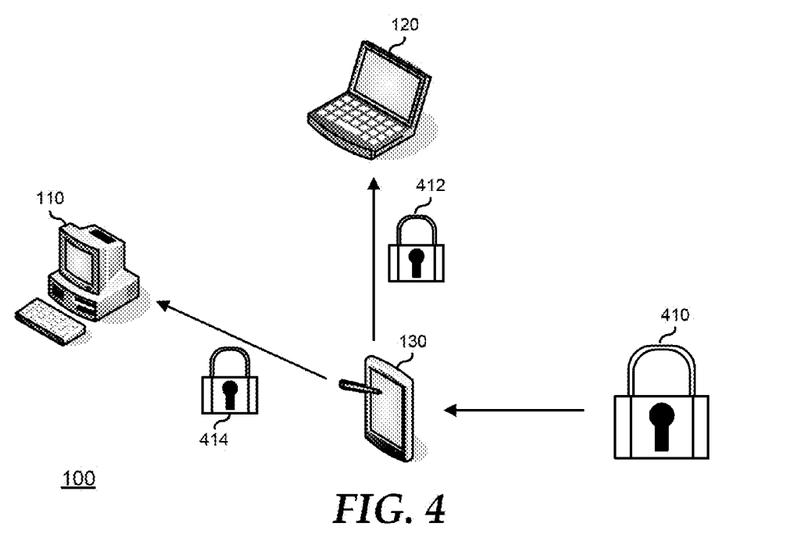

FIG. 4 illustrates an embodiment of network 100 where system 130 receives a security key 410. For example, security key 410 can include a WiFi or other network access password, an encryption key, or another type of security information, as needed or desired. Security key 410 can be provided to system 130 by a user of network 100, or can be received from another system, such as a security update system (not illustrated). In this embodiment, system 130 operates as a master system for security management to distribute security key 410 to systems 110 and 120. Here, when system 130 receives security key 410, a first copy 412 of the security key is provided to system 110, and a second copy 414 is provided to system 120. System 130 is designated as the security management master by one or more of the methods described above. The skilled artisan will understand that the roles of policy management master system, software management master system, and security management master system are roles that can be assumed by any one or more of systems 110, 120, and 130.

Figure 5:
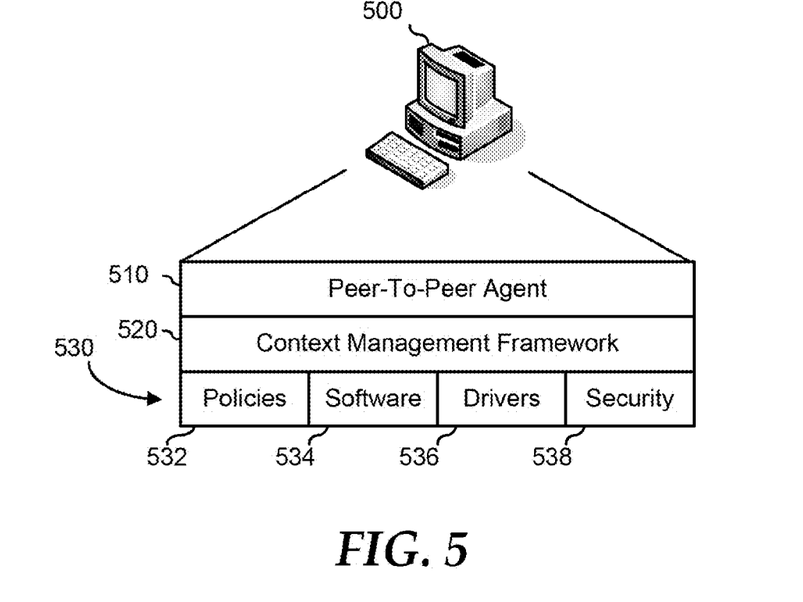
FIG. 5 is a block diagram of a system of the network of FIGS. 1-4.

FIG. 5 illustrates a system 500 similar to systems 110, 120, or 130. System 500 includes a peer-to-peer agent 510, a context management framework 520, and a group of context items 530. Context items 530 include policies 532, software 534, drivers 536, and security elements 538. When system 500 receives a new or updated context item 530, context management framework 520 invokes peer-to-peer agent 510 to establish a peer-to-peer session with another system. Context management framework 520 operates to determine if the other system has received the context item 530. If not, context management framework 520 becomes the master system for the context item 530 can directs peer-to-peer agent 510 to provide a copy of the context item to the other system. In the other system, a context management framework similar to context management framework 520 operates to install the copy of the context item in the other system. In this way, system 500 operates to propagate changes in the context of the system to other systems in the network. In a particular embodiment, context management framework 520 can negotiate with the context management framework of the other system to establish which system is the master system. Here, system 500 can provide the copy of the context item 530, and also cede the control of context management to the other system, and the other system can operate to propagate changes in the context of the system to other systems in the network.

In a particular embodiment, system 500, system 500 is initially configured with context item 530. Here, when system 500 is connected to another system in a network similar to network 100, context management framework 520 can determine that the system is a master system, and that context item 530 is to be distributed to the other system. Then, context management framework 520 invokes peer-to-peer agent 510 to establish a peer-to-peer session with the other system, and determines if the other system has received the context item 530. If not, then in its designation as the master system, context management framework 520 directs peer-to-peer agent 510 to provide a copy of the context item to the other system, and a context management framework in the other system installs the copy of the context item in the other system. In this way, system 500 operates to propagate the original context to other systems in the network.

Figure 6:
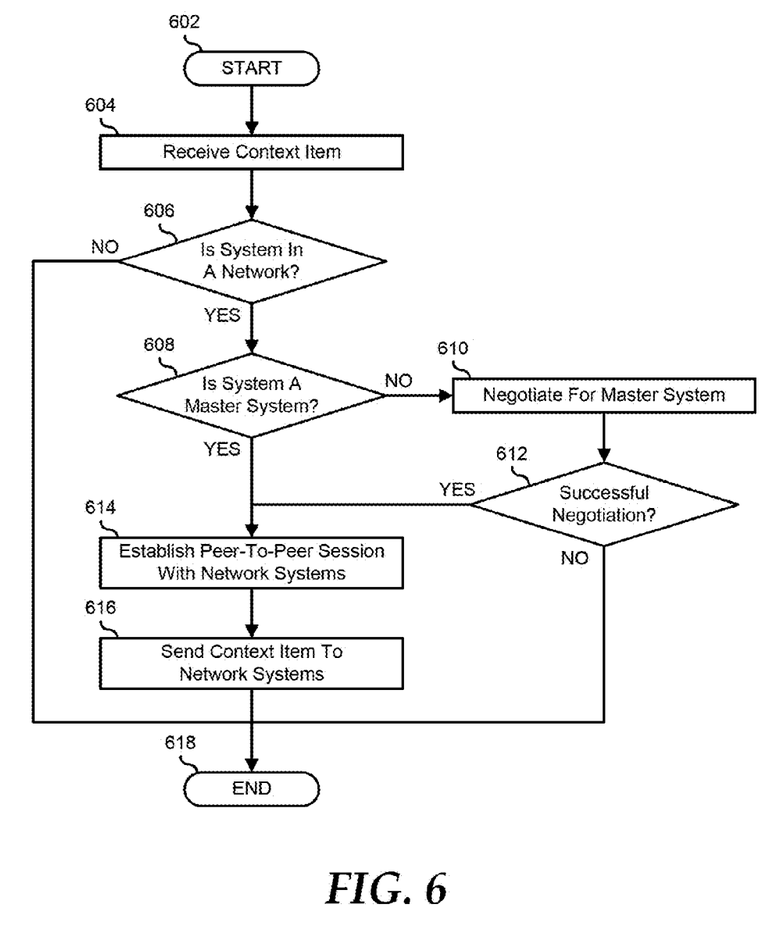
FIG. 6 is a flow diagram of a method of peer-to-peer management through policy and context replication according to an embodiment of the present disclosure.

FIG. 6 illustrates a method of peer-to-peer management through policy and context replication beginning at block 602. A context item, such as a new or updated policy, new or updated software or driver, a new or updated security key, or the like is received at a system in block 604. A decision is made as to whether or not the system that received the context item is in a network in decision block 606. If not, the "NO" branch of decision block 606 is taken, and the method ends in block 618. If the system is in a network, the "YES" branch of decision block 606 is taken, and a decision is made as to whether or not the system is a context management master system in decision block 608. If so, the "YES" branch of decision block 608 is taken and the method proceeds to block 614, as described below.

If the system is not the context management master system, the "NO" branch of decision block 608 is taken, the system negotiates to become the context the management master system in block 610, and a decision is made as to whether or not the system successfully negotiated to become the context management master system in decision block 612. If not, the "NO" branch of decision block 612 is taken, and the method ends in block 618. If the system successfully negotiated to become the context management master, the "YES" branch of decision block 612 is taken, and the method continues in block 614, as described below. If either the system is determined to be the context management master system, as determined in decision block 608, or the system successfully negotiated to become the context management master system as determined in decision block 612, the system establishes a peer-to-peer session with the systems in the network in block 614. Once the peer-to-peer sessions are established, the system sends the context item to the systems in the network in block 616, and the method ends in block 618.

Figure 7:
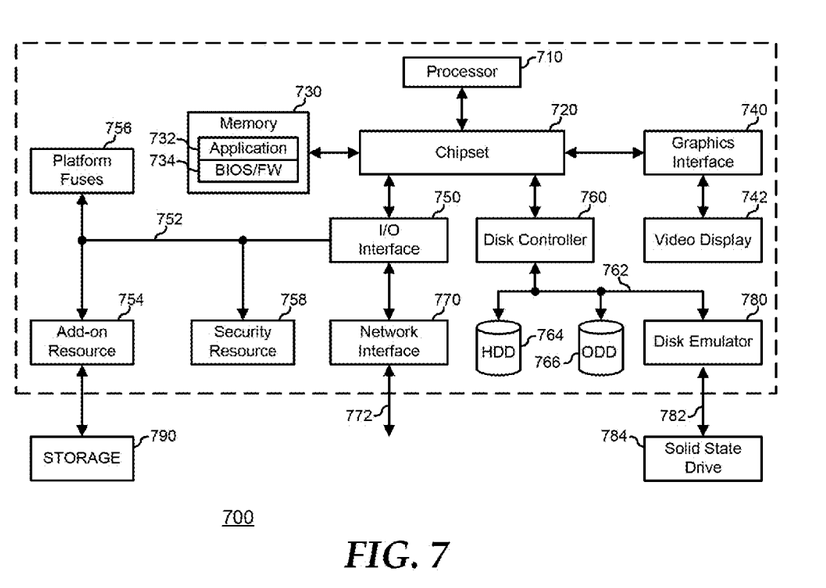
FIG. 7 is a functional block diagram illustrating an exemplary embodiment of an information handling system.

FIG. 7 illustrates an information handling system 700, including a processor 710, a chipset 720, a memory 730, a graphics interface 740, an input/output (I/O) interface 750, a disk controller 760, a network interface 770, and a disk emulator 780. In a particular embodiment, information handling system 700 is used to carry out one or more of the methods described herein. In another embodiment, one or more of the systems described herein are implemented in the form of information handling system 700.

Chipset 720 is connected to and supports processor 710, allowing the processor to execute machine-executable code. In a particular embodiment, information handling system 700 includes one or more additional processors, and chipset 720 supports the multiple processors, allowing for simultaneous processing by each of the processors and permitting the exchange of information among the processors and the other elements of the information handling system. Chipset 720 can be connected to processor 710 via a unique channel, or via a bus that shares information among the processor, the chipset, and other elements of information handling system 700.

Memory 730 is connected to chipset 720. Memory 730 and chipset 720 can be connected via a unique channel, or via a bus that shares information among the chipset, the memory, and other elements of information handling system 700. In another embodiment (not illustrated), processor 710 is connected to memory 730 via a unique channel. In another embodiment (not illustrated), information handling system 700 includes separate memory dedicated to each of the one or more additional processors. A non-limiting example of memory 730 includes static random access memory (SRAM), dynamic random access memory (DRAM), non-volatile random access memory (NVRAM), read only memory (ROM), flash memory, another type of memory, or any combination thereof.

Graphics interface 740 is connected to chipset 720. Graphics interface 740 and chipset 720 can be connected via a unique channel, or via a bus that shares information among the chipset, the graphics interface, and other elements of information handling system 700. Graphics interface 740 is connected to a video display 742. Other graphics interfaces (not illustrated) can also be used in addition to graphics interface 740 as needed or desired. Video display 742 includes one or more types of video displays, such as a flat panel display, another type of display device, or any combination thereof.

I/O interface 750 is connected to chipset 720. I/O interface 750 and chipset 720 can be connected via a unique channel, or via a bus that shares information among the chipset, the I/O interface, and other elements of information handling system 700. Other I/O interfaces (not illustrated) can also be used in addition to I/O interface 750 as needed or desired. I/O interface 750 is connected via an I/O interface 752 to one or more add-on resources 754. Add-on resource 754 is connected to a storage system 790, and can also include another data storage system, a graphics interface, a network interface card (NIC), a sound/video processing card, another suitable add-on resource or any combination thereof. I/O interface 750 is also connected via I/O interface 752 to one or more platform fuses 756 and to a security resource 758. Platform fuses 756 function to set or modify the functionality of information handling system 700 in hardware. Security resource 758 provides a secure cryptographic functionality and includes secure storage of cryptographic keys. A non-limiting example of security resource 758 includes a Unified Security Hub (USH), a Trusted Platform Module (TPM), a General Purpose Encryption (GPE) engine, another security resource, or a combination thereof.

Disk controller 760 is connected to chipset 720. Disk controller 760 and chipset 720 can be connected via a unique channel, or via a bus that shares information among the chipset, the disk controller, and other elements of information handling system 700. Other disk controllers (not illustrated) can also be used in addition to disk controller 760 as needed or desired. Disk controller 760 includes a disk interface 762. Disk controller 760 is connected to one or more disk drives via disk interface 762. Such disk drives include a hard disk drive (HDD) 764, and an optical disk drive (ODD) 766, and can include one or more disk drive as needed or desired. ODD 766 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 760 is connected to disk emulator 780. Disk emulator 780 permits a solid-state drive 784 to be coupled to information handling system 700 via an external interface 782. External interface 782 can include industry standard busses such as USB or IEEE 1394 (Firewire) or proprietary busses, or any combination thereof. Alternatively, solid-state drive 784 can be disposed within information handling system 700.

Network interface device 770 is connected to I/O interface 750. Network interface 770 and I/O interface 750 can be coupled via a unique channel, or via a bus that shares information among the I/O interface, the network interface, and other elements of information handling system 700. Other network interfaces (not illustrated) can also be used in addition to network interface 770 as needed or desired. Network interface 770 can be a network interface card (NIC) disposed within information handling system 700, on a main circuit board such as a baseboard, a motherboard, or any combination thereof, integrated onto another component such as chipset 720, in another suitable location, or any combination thereof. Network interface 770 includes a network channel 772 that provide interfaces between information handling system 700 and other devices (not illustrated) that are external to information handling system 700. Network interface 770 can also include additional network channels (not illustrated).

Information handling system 700 includes one or more application programs 732, and Basic Input/Output System and Firmware (BIOS/FW) code 734. BIOS/FW code 734 functions to initialize information handling system 700 on power up, to launch an operating system, and to manage input and output interactions between the operating system and the other elements of information handling system 700. In a particular embodiment, application programs 732 and BIOS/FW code 734 reside in memory 730, and include machine-executable code that is executed by processor 710 to perform various functions of information handling system 700. In another embodiment (not illustrated), application programs and BIOS/FW code reside in another storage medium of information handling system 700. For example, application programs and BIOS/FW code can reside in HDD 764, in a ROM (not illustrated) associated with information handling system 700, in an option-ROM (not illustrated) associated with various devices of information handling system 700, in storage system 790, in a storage system (not illustrated) associated with network channel 772, in another storage medium of information handling system 700, or a combination thereof. Application programs 732 and BIOS/FW code 734 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of context replication, the method comprising:
designating a first information handling system as a context management master system for a home network in response to receiving a first context item, wherein the context item includes one of a policy, a software program, a device driver, and a security key;
establishing a first peer-to-peer session between the first information handling system and a second information handling system;
determining that the second information handling system has not received the first context item; and
providing, from the first information handling system, the first context item to the second information handling system in response to determining that the second information handling system has not received the first context item.

2. The method of claim 1, further comprising:
negotiating, by the second information handling system, to become the context management master system;
establishing a second peer-to-peer session between the second information handling system a third information handling system in the network in response to negotiating to become the context management master system; and
providing, from the second information handling system, a second context item to the third information handling system.

3. The method of claim 1, wherein determining that the first information handling system is the context management master system further comprises:
determining that a third information handling system in the network is the context management master system; and
negotiating, by the first information handling system, to become the context management master system.

4. The method of claim 3, wherein:
the first information handling system includes a context management framework; and
the negotiating is done by the context management framework.

5. The method of claim 1, wherein the network comprises an enterprise network.

6. An information handling system comprising:
a memory; and
a processor that:
designates the information handling system as a context management master system for a network in response to receiving a first context item wherein the context item includes one of a policy, a software pro: ram, a device driver, and a security key;
establishes a first peer-to-peer session between the information handling system and a first network system in response to designating the information handling system as the context management master system;
provides the first context item to the first network system;
receives a second context item;
establishes a second peer-to-peer session between the first network system and a second network system; and
provides the second context item to the second network system.

7. The information handling system of claim 6, wherein in designating the information handling system as the context management master system, the processor further:
determines that a second network system is the context management master system; and
negotiates with the second network system to become the context management master system.

8. The information handling system of claim 7, wherein:
the information handling system includes a context management framework; and
the negotiating is done by the context management framework.

9. The information handling system of claim 6, wherein the network comprises a home network.

10. The information handling system of claim 6, wherein the network comprises an enterprise network.

11. A non-transitory computer-readable medium including code for performing a method, the method comprising:
designating a first information handling system as a context management master system for a network in response to receiving a first context item wherein the context item includes one of a policy, a software program, a device driver, and a security key;
establishing a first peer-to-peer session between the first information handling system and a second information handling system; and
providing, from the first information handling system, the first context item to the second information handling system in response to determining that the second information handling system has not received the first context item;
wherein:
the first information handling system includes a context management framework; and
the negotiating is done by the context management framework.

12. The computer-readable medium of claim 11, the method further comprising:
receiving a second context item at the second information handling system;
negotiating, by the second information handling system, to become the context management master system;
establishing a second peer-to-peer session between the second information handling system and a third information handling system in the network in response to negotiating to become the context management master system; and
providing, from the second information handling system, the second context item to the third information handling system.

13. The computer-readable medium of claim 11, wherein in determining that the first system is the context management master system the method further comprises:
determining that a third information handling system in the network is the context management master system; and
negotiating, by the first information handling system, to become the context management master system.

14. The computer-readable medium of claim 11, wherein the network comprises a home network.

* * * * *

UNITED STATES PATENT AND TRADEMARK OFFICE
CERTIFICATE OF CORRECTION

PATENT NO. : 9,516,106 B2  
APPLICATION NO. : 15/019224  
DATED : December 6, 2016  
INVENTOR(S) : Carlton A. Andrews et al.

Page 1 of 1

It is certified that error appears in the above-identified patent and that said Letters Patent is hereby corrected as shown below:

Column 9, Lines 51-52, Claim 6 change "designates the information handling system as a context management master system for a network in response to receiving a first context item wherein the context item includes one of a policy, a software pro:ram, a device driver, and a security key;" to -- designates the information handling system as a context management master system for a network in response to receiving a first context item wherein the context item includes one of a policy, a software program, a device driver, and a security key; --

Signed and Sealed this
Twenty-first Day of February, 2017

Michelle K. Lee
*Director of the United States Patent and Trademark Office*